United States Patent [19]
Nakano et al.

[11] Patent Number: 5,034,441
[45] Date of Patent: Jul. 23, 1991

[54] STYRENE-BASED RESIN COMPOSITION AND PROCESS FOR PRODUCING MOLDING PRODUCTS THEREOF

[75] Inventors: Akikazu Nakano; Takashi Sumitomo, both of Ichihara, Japan

[73] Assignee: Idemitsu Kosan Co., Ltd., Tokyo, Japan

[21] Appl. No.: 559,971

[22] Filed: Jul. 27, 1990

Related U.S. Application Data

[63] Continuation-in-part of Ser. No. 470,975, Jan. 26, 1990, abandoned.

[30] Foreign Application Priority Data

Feb. 2, 1989 [JP] Japan ................................. 1-22587

[51] Int. Cl.$^5$ .............................................. C08K 5/15
[52] U.S. Cl. ...................................... 524/117; 524/127; 524/377; 524/385; 524/388; 524/307; 524/228; 524/577; 524/394
[58] Field of Search ............... 524/117, 127, 228, 377, 524/385, 388

[56] References Cited

U.S. PATENT DOCUMENTS

| | | | |
|---|---|---|---|
| 4,463,113 | 7/1984 | Nakahara et al. | 524/117 |
| 4,619,959 | 10/1986 | Matsubara et al. | 524/228 |
| 4,680,353 | 7/1987 | Ishihara et al. | 526/159 |
| 4,820,772 | 4/1989 | Goto et al. | 524/117 |

Primary Examiner—Joseph L. Schofer
Assistant Examiner—Mark D. Sweet
Attorney, Agent, or Firm—Frishauf, Holtz, Goodman & Woodward

[57] ABSTRACT

Disclosed is a styrene-based resin composition which comprises (a) 100 parts by weight of styrene-based polymer having a high degree of syndiotactic configuration, (b) 0.01 to 15 parts by weight of at least one nucleating agent selected from an organophosphorus compound and a metal salt of an organic acid, and (c) 0.01 to 15 parts by weight of at least one component selected from a polyoxyalkylene compound, a fatty acid and a derivative thereof.

The composition can produce various molding products with excellent mold-releasing property, surface gloss, bending strength, bending modulus and heat resistance.

6 Claims, No Drawings

STYRENE-BASED RESIN COMPOSITION AND PROCESS FOR PRODUCING MOLDING PRODUCTS THEREOF

This application is a continuation-in-part of U.S. application Ser. No. 07/470,975, filed Jan. 26, 1990, now abandoned.

BACKGROUND OF THE INVENTION

1. Field of the Invention

The present invention relates to a styrene-based resin composition and process for producing molding products thereof, more specifically it relates to a styrene-based resin composition which comprises a styrene-based polymer having a high degree of syndiotactic configuration and specific components mixed therewith, and a process for producing molding products prepared from the composition, which has a high crystallinity, an excellent surface gloss property and an excellent mold-releasing property.

2. Description of the Related Arts

A styrene based polymer produced by the radical polymerization method, etc. has an atactic configuration in stereostructure. It is molded into various shapes by various molding methods such as injection molding, extrusion molding, blow molding, vacuum forming and flow-in molding, for example, and is widely used for electric domestic appliances, office equipments, domestic appliances, packaging, toys, furnitures, synthetic papers and other industrial materials. However, the styrene-based polymer having an atactic configuration has drawbacks of insufficient mechanical strength, heat resistance and chemical resistance since it is not crystallized.

The group of the present inventors have succeeded to develop a styrene-based polymer having a high degree of syndiotacticity, and also developed a composition in which other components are blended with the styrene-based polymer (Japanese Patent Application Laid-Open Nos. 104818/1987, 257948/1987 and 257950/1987). This styrene-based polymer having a high degree of syndiotactic configuration or a composition thereof has excellent mechanical strength, heat resistance, solvent resistance and electric characteristic as compared with a styrene-based polymer having an atactic configuration and its composition. However, the molding product obtained by using the styrene-based polymer having a high degree of syndiotacticity as a raw material requires high molding temperature to crystallize.

In Japanese Patent Application Laid-Open No. 201350/1989, there is proposed to accelerate the crystallization of a styrene-based polymer having a syndiotactic configuration by blending a specific nucleating agent, and the mold-releasing property and appearance of the molding products therefrom have been improved.

According to this technique, while physical properties or appearance of the composition or the molding products obtained can be improved, there remains some problems that crystallization rate is insufficiently high and surface gloss of the molding products is poor.

SUMMARY OF THE INVENTION

An object of the present invention is to provide a styrene-based resin composition which can produce a molding product having a high crystallinity and a good appearance.

Another object of the present invention is to provide a process for efficiently producing the molding product with excellent properties described above.

The present invention provides a styrene-based resin composition which comprises (a) 100 parts by weight of styrene based polymer having a high degree of syndiotactic configuration, (b) 0.01-15 parts by weight of a nucleating agent consisting of at least one component selected from an organophosphorus compound and a metal salt of an organic acid, and (c) 0.01-15 parts by weight of at least one component selected from a polyoxyalkylene compound, a fatty acid and a derivative thereof. The present invention also provides a process for producing molded products (molding products) which process comprises molding said styrene-based resin composition with a die at a low temperature.

The styrene-based resin composition in the present invention is composed essentially of (a), (b) and (c). Here, the syndiotactic configuration in styrene-based polymer of the (a) component means that its stereo chemical structure is a syndiotactic configuration, i.e., having a stereo structure in which phenyl groups or substituted phenyl groups are located as side chains alternatively in opposite directions relative to the main chain consisting of carbon-carbon bonds. Tacticity is quantitatively determined by the nuclear magnetic resonance method using a carbon isotope ($^{13}$C-NMR method).

The tacticity, as determined by the $^{13}$C-NMR method, can be indicated in terms of the proportions of structural units connected continuously to each other, i.e., a diad in which two structural units are connected to each other, a triad in which three structural units are connected to each other, or a pentad in which five structural units are connected to each other. The styrene-based polymers having a high degree of syndiotactic configuration have such a syndiotactic configuration that the proportion of racemic diad is at least 75% and preferably at least 85%, or the proportion of racemic pentad is at least 30% and preferably at least 50% in syndiotacticity. The styrene-based polymers having a high degree of syndiotactic configuration in the present invention include polystyrene, poly(alkylstyrene), poly(halogenated styrene), poly(alkoxystyrene), poly(vinyl benzoate ester) and mixtures thereof, and copolymers containing them as main components. The above poly(alkyl styrene) includes poly(methylstyrene), poly(ethylstyrene), poly(isopropylstyrene), poly(tert-butylstyrene), poly(vinyl benzene), etc, and the poly(halogenated styrene) includes poly(chlorostyrene), poly(bromostyrene), poly(fluorostyrene), etc. The poly(alkoxystyrene) also includes poly(methoxystyrene), poly(ethoxystyrene), etc. The most preferred styrene-based polymers are polystyrene, poly(p-methylstyrene), poly(m-methylstyrene), poly(tert-butyl styrene), poly(p-chlorostyrene), poly(m-chlorostyrene), poly(p-fluorostyrene), and a copolymer of styrene and p-methylstyrene.

The molecular weight of the styrene-based polymer used in the present invention is not critical, but the weight average molecular weight is preferably at least 10,000, and most preferably at least 50,000. The molecular weight distribution is not critical, and the styrene-based polymers in various ranges of molecular weight can be applied. Styrene-based polymer with a weight average molecular weight of less than 10,000 is not suitable because the composition obtained and its molded products have inferior thermal characteristics and mechanical strength.

The styrene-based polymers having a syndiotactic configuration can be produced by polymerizing styrene-based monomers (corresponding to the above styrene-based polymers) using a catalyst comprising a titanium compound and a condensate of water and trialkyl aluminium in, for example, an inert hydrocarbon solvent or in the absence of a solvent (Japanese Patent Application Laid Open No. 187708/1987).

The component (b) of the resin composition in the present invention consists of any one or both of a metal salt of an organic acid and an organophosphorus compound. The metal salt of an organic acid includes sodium, calcium, aluminium or magnesium salt of benzoic acid, p-(tert-butyl) benzoic acid, cyclohexane carboxylic acid (hexahydro benzoic acid), amino benzoic acid, $\beta$-naphthoic acid, cyclopentane carboxylic acid, succinic acid, diphenyl acetic acid, glutaric acid, isonicotinic acid, adipic acid, sebacic acid, phthalic acid, isophthalic acid, benzene sulfonic acid, glycolic acid, caproic acid, isocaproic acid, phenyl acetic acid, cinnamic acid, lauric acid, myristic acid, palmitic acid, stearic acid, and oleic acid. In particular, aluminium salt of p-(tert-butyl) benzoic acid, sodium salt of cyclohexane carboxylic acid and sodium salt of $\beta$-naphthoic acid, etc., are preferred.

The preferred organophosphorus compounds are organophosphorus compounds (b$_1$) represented by the general formula:

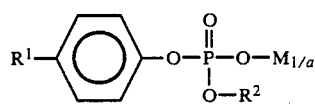
(B-I)

(wherein R$^1$ represents a hydrogen or an alkyl group having 1 to 18 carbon atoms, R$^2$ represents an alkyl group having 1 to 18 carbon atoms,

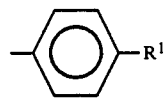

or M$_{1/a}$, M represents Na, K, Mg, Ca or Al, and a represents an atomic valence of M) and organophosphorus compounds (b$_2$) represented by the general formula:

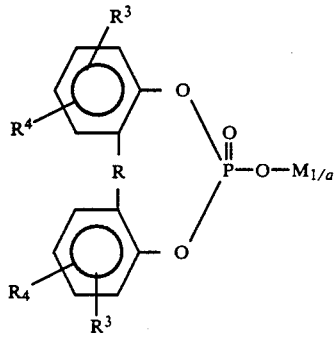
(B-II)

(wherein R represents a methylene group, an ethylidene group, a propylidene group or an isopropylidene group, R$^3$ and R$^4$ independently represent a hydrogen atom or an alkyl group having 1 to 6 carbon atoms, and M and a are the same as defined above).

Specific examples of the organophosphorus compounds (b$_1$) represented by the general formula above (B-I) are shown below:

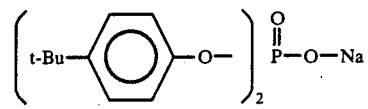

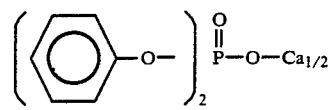

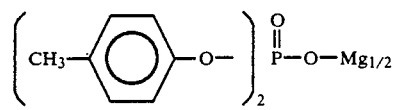

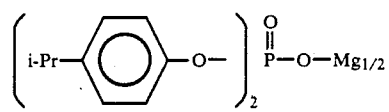

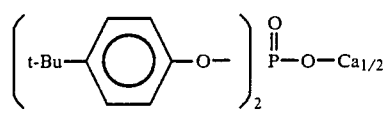

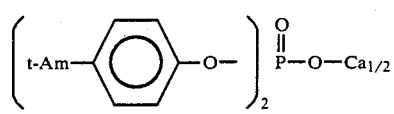

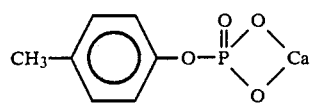

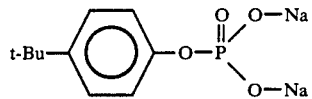

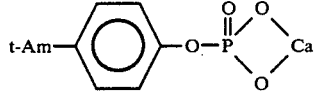

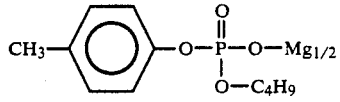

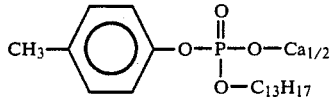

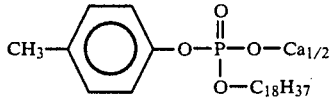

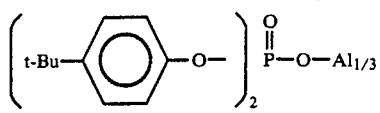

In connection with the organophosphorus compounds (b$_2$) represented by the general formula (B-II), there are a variety of compounds depending on the type of R, R$^3$, and R$^4$ and M represented by the formula above. R$^3$ and R$^4$ independently represent a hydrogen atom or an alkyl group having 1 to 6 carbon atoms. Examples of the alkyl group are a methyl group, an ethyl group, an isopropyl group, a n-butyl group, an isobutyl group, a sec-butyl group, a tert-butyl group, a n-amyl group, a tert-amyl group, and a hexyl group.

Specific examples of organophosphorus compounds (b$_2$) are shown below:

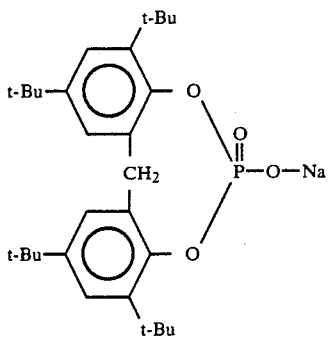

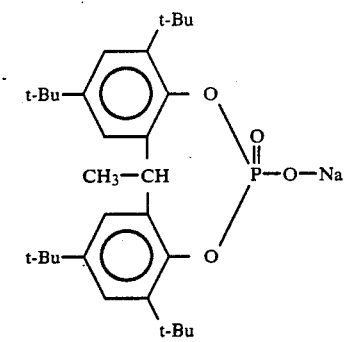

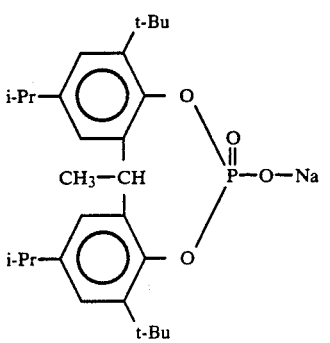

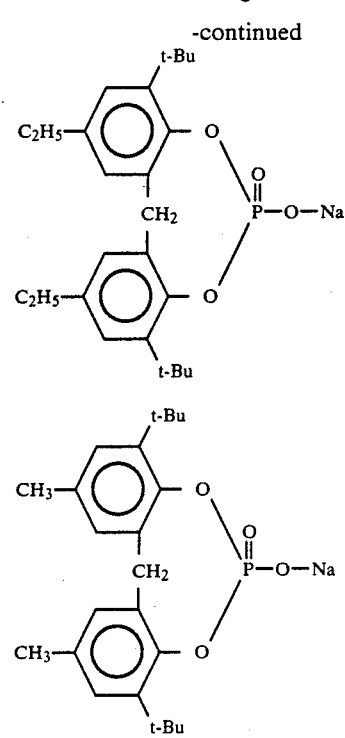

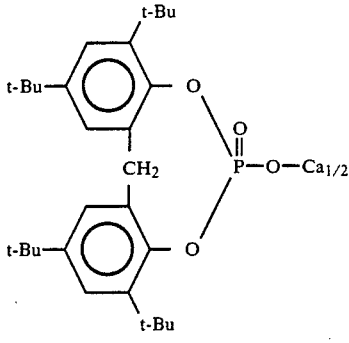

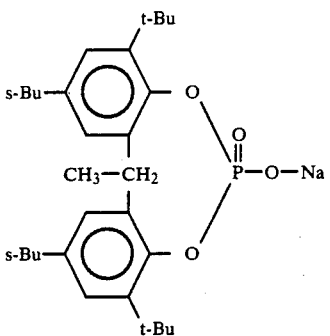

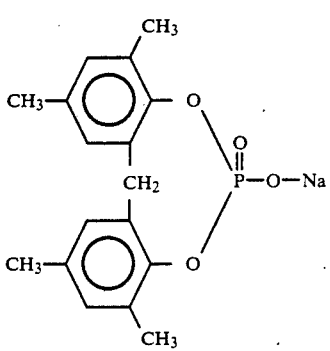

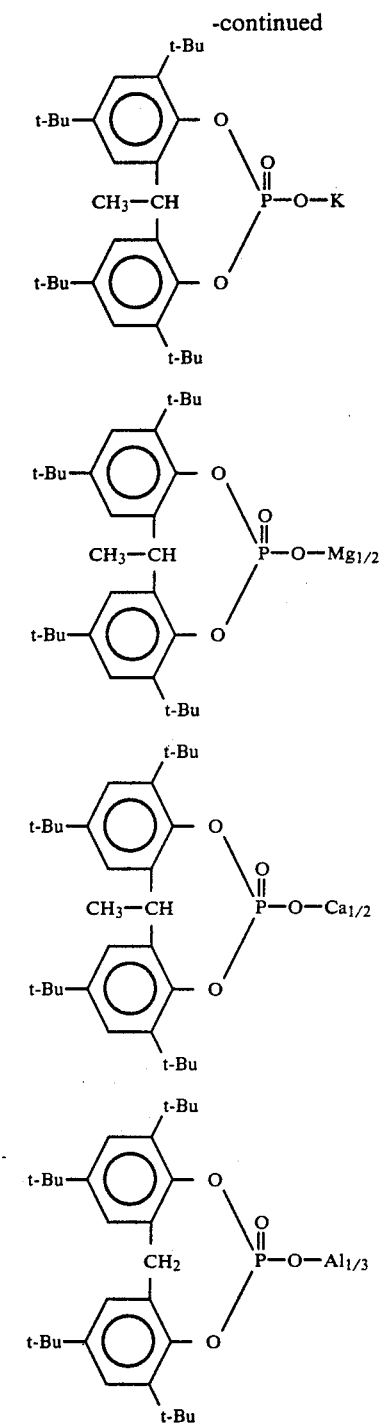

In the present invention, the component (b) comprising a metal salt of an organic acid and an organophosphorus compound works as a nucleating agent in order to accelerate the crystallinity of the component (a), the styrene-based polymers having a high degree of syndiotactic configuration. The amount of the nucleating agent added is 0.01 to 15 parts by weight, preferably 0.05 to 10 parts by weight per 100 parts by weight of the component (a). If the amount of the component (b) added is less than 0.01 part by weight, the effect for accelerating the crystallinity of the styrene-based polymers described above can hardly be expected. On the other hand, if it is in excess of 15 parts by weight, the resulting resin composition or the molded products thereof are markedly reduced in heat resistance and chemical-resistance, and thus are unsuitable for practical use.

The resin composition of the present invention comprises, in addition to the above components (a) and (b), a polyoxyalkylene compound and/or a fatty acid or a derivative thereof as the component (c). Polyoxyalkylene compound includes a polyoxyethylene compound, a polyoxypropylene compound and various compounds having a recurring unit of polyoxyalkylene group with 2 to 5 carbon atoms. Among these compounds, a compound represented by the general formula:

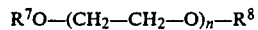

$$R^7O-(CH_2-CH_2-O)_n-R^8$$

(wherein $R^7$ and $R^8$ are each a hydrogen or an alkyl group having 1 to 4 carbon atoms, n is an integer of 4 to 450, preferably 15 to 45), and alkyl ethers thereof such as polyoxyethylene monomethyl ether, polyoxyethylene dimethyl ether, polyoxyethylene diethyl ether and polyoxyethylene dipropyl ether are preferred. Among those alkyl ethers, polyoxyethylene dimethyl ether is most preferred. The molecular weight of the polyoxyethylene compound described above is 200 or more, preferably 500 to 20,000, and most preferably 700 to 2,000.

As for the component (c), a fatty acid or a derivative thereof can be used singly or in combination with the polyoxyalkylene compound. As the fatty acid, a fatty acid having 1 to 31 carbon atoms can be used, and more specifically, it includes a saturated fatty acid such as formic acid, acetic acid, propionic acid, n-butyric acid, n-valeric acid, caproic acid, enanthic acid, caprylic acid, pelargonic acid, capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, serotic acid, heptacosanic acid, montanic acid, melissic acid, lacceroic acid, and an unsaturated fatty acid such as acrylic acid, crotonic acid, isocrotonic acid, undecylenic acid, oleic acid, elaidic acid, cetoleic acid, erucic acid, brassidic acid, sorbic acid, linolic acid, linolenic acid, arachidonic acid, propyolic acid, stearolic acid. Among these, a fatty acid having 10 to 24 carbon atoms is preferred.

As fatty acid derivatives, oxy fatty acid, fatty acid amide, alkylenebis fatty acid amide and fatty acid ester can be used. These derivatives have 1 to 31 carbon atoms, preferably 10 to 24 carbon atoms in the fatty acid portion. The oxy fatty acid is an acid wherein hydrogen at a hydrocarbon portion of the fatty acid mentioned above is substituted by a hydroxyl group, the fatty acid amide is that wherein the carboxyl group of the above fatty acid is modified to amide (for example, behenic acid amide), and the fatty acid ester is that wherein the above fatty acid is esterified with an alcohol.

In the present invention, among these fatty acid derivatives, alkylene-bis-fatty acid amide is most preferably used. The alkylene-bis-fatty acid amide is represented by the following general formula:

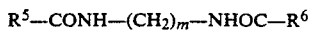

$$R^5-CONH-(CH_2)_m-NHOC-R^6$$

wherein $R^5$ and $R^6$ each represent identical or different hydrocarbon portion of the fatty acid, m is an integer of 1 to 10. A preferred example of the alkylene-bis-fatty acid amide includes methylene-bis-stearic acid amide, ethylene-bis-stearic acid amide and ethylene-bis-behenic acid amide.

In the resin composition of the present invention, the component (c) works to accelerate crystallinity of the resin composition and improve mold-releasing property. The amount of the component (c) added is 0.01 to 15 parts by weight, preferably 0.05 to 10 parts per 100 parts by weight of the component (a). If the amount of the component (c) added is less than 0.01 part by weight, the effect of accelerating the crystallinity of the above resin composition can hardly be expected. As the result, improvements of crystallinity, mold-releasing property and appearance of the molded products cannot be accomplished. On the other hand, if it is in excess of 15 parts by weight, the mechanical strength, elasticity and heat resistance of the resulting resin composition or molded products thereof are markedly reduced.

When the mixing ratio (weight ratio) of the component (b): the component (c) in the present composition is selected in the range of 1:1 to 1:100, preferably 1:2 to 1:50, a markedly higher effect for accelerating crystallinity can be achieved.

The resin composition of the present invention is composed essentially of the components (a), (b) and (c) as the main components, and if necessary, and inorganic filler can be optionally added.

The inorganic filler may be any of fibrous, granular or power in form. Examples of the fibrous filler include glass fiber, carbon fiber, and alumina fiber. Of these fibers, glass fiber and carbon fiber are particularly preferred. The shape of the glass fiber can be either cloth-like, mat-like, strand-like, short fiber-like or filament-like. Of these fibers, strand-like glass fiber having a length of 0.05 to 13 mm and a fiber diameter of 5 to 15 $\mu$m is preferred. Most preferred is a strand-like glass fiber subjected to silane treatment. A polyacrylonitrile (PAN)-based fiber is preferred as a carbon fiber. Bundles of chopped PAN fiber with a length of about 3 mm and a diameter of 7 to 15 $\mu$m are more preferred.

As examples of granular or powder inorganic fillers, there may be mentioned talc, carbon black, graphite, titanium dioxide, silica, mica, calcium carbonate, calcium sulfate, barium carbonate, magnesium carbonate, magnesium sulfate, barium sulfate, oxy sulfate, tin oxide, alumina, kaolin, silicon carbide and metal powder. Of these fillers, talc, calcium carbonate, and mica are most preferred. The average particle diameter of talc is preferably 0.3 to 20 $\mu$m, more preferably 0.6 to 10 $\mu$m. The average particle diameter of calcium carbonate is preferably 0.1 to 20 $\mu$m. The average particle diameter of mica is preferably 40 to 250 $\mu$m, and more preferably 50 to 150 $\mu$m.

The inorganic filler described above is added in a ratio of 1 to 550 parts by weight, preferably 4 to 200 parts by weight per 100 parts by weight of the above the component (a). If the amount of the inorganic filler added is less than 1 part by weight, a sufficient effect as filler cannot be expected. On the other hand, if it is in excess of 500 parts by weight, the inorganic filler cannot be dispersed uniformly, whereby the resulting composition might be inferior in mechanical strength.

To the resin composition of the present invention can be added various additives or various synthetic resins, as well as the above components (a)-(c) and the inorganic filler, if it does not impair the purpose of this invention. The above additives include antioxidants such as phosphite ester series and phosphate ester series, UV ray adsorbers such as benzotriazole series or benzophenone series, external lubricants such as fatty carboxylic acid ester series and paraffinic series, conventionally used nucleating agents, mold-releasing agents, antistatic agents, colorants etc. Synthetic resins mentioned above include polyethylene, polypropylene, polystyrene, AS-resin, ABS-resin, polymethylmethacrylate, polyphenylene ether, polyphenylene sulfide, polyamide, polyarylate, polycarbonate etc. Addition of various elastomers thereto is also effective.

In the preparation of the resin composition of the present invention, the above components (a) to (c) and other desired components are compounded and mixed at a room temperature or are blended by various methods such as melt-kneading. More specifically, the melt-kneading method using a kneader, a mixing roll, an extruder, a Banbury mixer, a Henschel mixer and kneading roll, or the solution blending method etc., can be employed.

In the resin composition of the present invention, it is preferred that recrystallization peak measured by a differential scanning calorimeter (DSC) either disappeared, or the temperature of recrystallization peak ($T_{cc}$) is 170° C. or lower, specifically 150° to 90° C., and peak area (crystallizing enthalpy on heating) ($\Delta H_{TCC}$) is 2 cal/g or less.

In the process for producing molding products in the present invention, the styrene-based resin composition described above can be molded at a low temperature, specifically at room temperature to 200° C., more preferably at a die temperature of 60° to 160° C. The temperature of a resin composition when molding is not specifically restricted, but preferably it is heated and molten at a temperature of the melting point to 360° C.

A suitable molding method can be selected according to the molding products to be produced, and various thermal molding methods for the conventional styrene-based polymer having an atactic configuration, for example press molding, injection molding, blow molding, vacuum molding, flow-in molding, cast molding, flow-spreading molding, coating molding, spinning molding, impregnation molding, coating molding such as dipping, brushing and spraying methods, and uniaxial or biaxial (sequential or simultaneous) stretching etc. can be used As mentioned above, according to the present invention, the styrene-based composition in which crystallization of the syndiotactic polystyrene is accelerated can be obtained. Further, by molding said composition with a die (mold) at a relatively low temperature, molding products having high mold-releasing property, crystallinity and surface gloss, as well as excellent in bending strength, bending modulus and heat resistance, can be prepared.

Accordingly, the resin composition and the molding products obtained of the present invention can be widely and effectively utilized for such various fields as general construction materials, electric and electronic parts, and automotive parts, as well as film, fiber, sheets etc.

The present invention is described in greater detail with examples and reference examples as follows.

REFERENCE EXAMPLE 1

(Preparation of Polystyrene having a Syndiotactic Configuration)

Two liters (L) of toluene as a solvent, and 5 mmol of tetraethoxytitanium and 500 mmol (as aluminum atom) of methylaluminoxane as catalyst components were placed in a reactor, and 15 L of styrene were introduced thereinto and polymerized for 4 hours at 55° C.

After completion of the polymerization, the reaction product was washed with a mixture of hydrochloric acid and methanol to decompose and remove the catalyst components, and was then dried to obtain 2.5 kg of a styrene polymer (syndiotactic polystyrene). The polymer was subjected to Soxhlet extraction using methyl ethyl ketone as a solvent to obtain 97% by weight of an extraction residue. The weight average molecular weight of the polymer was 400,000 and the number average molecular weight was 180,000. Melting point of the polymer was 269° C. A $^{13}$C-NMR analysis (solvent: 1,2-dichlorobenzene) showed an absorption at 145.35 ppm, ascribable to the syndiotactic configuration, and the syndiotacticity indicated in terms of racemic pentad as calculated from the peak area was 98%.

EXAMPLE 1

One hundred parts by weight of polystyrene having a syndiotactic configuration obtained in Reference Example 1, 0.7 parts by weight of (2,6-di-tert-butyl-4-methylphenyl) pentaerythritol diphosphite (Trade Mark: PEP-36, produced by Adeca Argus Co., Ltd.) and 0.1 parts by weight of 2,6-di-tert-butyl-4-methylphenol (Trade Mark: SUMILIZER BHT, produced by Sumitomo Chemical Industry Co., Ltd.) as antioxidants, 1 part by weight of aluminum p-(tert-butyl) benzoate (Trade Mark: PTBBA-Al, produced by Dainippon Ink & Chemicals Inc.) and 4 parts by weight of polyoxyethylene dimethyl ether (weight average molecular weight 1,000, produced by Nippon Oil & Fats Co., Ltd.) were mixed, dry-blended and pelletized using a twin-screw extruder. The mixing ratio of the components described above are shown in Table 1.

Injection molding was carried out using pellets obtained at a die temperature of 100° C., then dumbbell test pieces were prepared for a bending test and flat plates were prepared for evaluating mold-releasing property. Furthermore, recrystallization peak, gloss of surface, crystallinity, bending strength, bending modulus and Vicat softening point were tested. The results are shown in Table 2.

Each of the characteristics is measured by the following procedure.

Recrystallization peak

A sample of 10 mg obtained by cutting a pellet was placed in a pan for measuring DSC, heated at the rate of 20° C./min under a nitrogen atmosphere, maintained at 300° C. for 5 minutes and melted.

After that, the sample in the pan was quenched at the rate of 100° C./sec in a dry ice-methanol bath.

Then, the sample in the pan was heated to 300° C. at the rate of 20° C./min under the nitrogen atmosphere. The exothermic peak generated at that time means the recrystallization peak ($T_{cc}$), and the peak area $\Delta H_{TCC}$ was measured by integration.

Gloss of Surface

It was measured according to JIS-K-7105.

Mold-releasing properties

It was evaluated by the following standard.
○ . . . easily released from the mold
△ . . . deformed when releasing from the mold
X . . . unable to be released from the mold

Crystallinity

It was measured by DSC.

Bending strength and bending modulus

They were measured according to JIS-L-7203.

Vicat softening point

It was measured according to JIS-K-7206.

EXAMPLES 2 to 19

The test pieces were prepared and evaluated in the same manner as in Example 1 except that components shown in Table 1 were compounded in prescribed amounts. The results are shown in Table 2.

COMPARATIVE EXAMPLES 1 to 6

The test pieces were prepared and evaluated in the same manner as in Example 1 except that components shown in Table 1 were compounded in prescribed amounts. The results are shown in Table 2.

Marks in Table 1 mean the following:

*1 Aluminum p-(tert-butyl) benzoate: PTBBA-Al, produced by Dainippon Ink & Chemicals Inc.

*2 Bis (4-tert-butylphenyl) sodium phosphate: NA-10, produced by Adeca Argus Co., Ltd.

*3 Methylene-bis (2,4-di-tert butyl phenyl) sodium phosphate: NA-11, produced by Adeca Argus Co., Ltd.

*4 Sodium stearate

*5 Polyoxyethylene dimethyl ether: a trial production, produced by Nippon Oil & Fats Co., Ltd, weight average molecular weight 1,000.

*6 Polyoxyethylene monomethyl ether: UNIOX M-550, produced by Nippon Oil & Fats Co., Ltd, weight average molecular weight 550.

*7 Polyoxyethylene: PEG 4000, produced by Nippon Oil & Fats Co., Ltd, weight average molecular weight 4,000

*8 Ethylene-bis-behenic acid amide: NPO-2, produced by Nippon Oil & Fats Co., Ltd.

*9 Ethylene-bis-stearic acid amide: EB-P, produced by KAO Co., Ltd.

*10 Behenic acid amide: produced by Nippon Oil & Fats Co., Ltd.

*11 Metablen IP-2, produced by Mitsubishi Rayon Co., Ltd. styrene grafted butadiene rubber, particle size 0.7 μm.

*12 Chopped strand CS 03 MA 429A, produced by Asahi Fiber Glass Co., Ltd, an average fiber length 3 mm, average fiber diameter 13 μm.

*13 Talc; FFR, produced by Asada Seifun Co., Ltd, average particle diameter: 0.6 μm.

TABLE 1

| NO. | Styrene-based polymer (parts by weight) | Organophosphorus compound or salt of organic acid (parts by weight) | Polyoxyethylene compound (parts by weight) | Fatty acid derivative (parts by weight) | Inorganic Elastomer (parts by weight) | filler (parts by weight) |
|---|---|---|---|---|---|---|
| Example 1 | 100 | 1*1 | 4*5 | — | — | — |

TABLE 1-continued

| NO. | Styrene-based polymer (parts by weight) | Organophosphorus compound or salt of organic acid (parts by weight) | Polyoxyethylene compound (parts by weight) | Fatty acid derivative (parts by weight) | Inorganic Elastomer (parts by weight) | filler (parts by weight) |
|---|---|---|---|---|---|---|
| Example 2 | 100 | 1*1 | — | 4*8 | — | — |
| Example 3 | 100 | 1*1 | 4*5 | 1*8 | — | — |
| Example 4 | 100 | 0.2*1 | 4*5 | — | — | — |
| Example 5 | 100 | 0.2*1 | 0.4*5 | 0.4*8 | — | — |
| Example 6 | 100 | 1*1 | 9*5 | — | — | — |
| Example 7 | 100 | 1*1 | — | 9*8 | — | — |
| Example 8 | 100 | 1*1 | 4*5 | 4*8 | — | — |
| Example 9 | 100 | 1*2 | 4*5 | 1*8 | — | — |
| Example 10 | 100 | 1*3 | 4*5 | 1*8 | — | — |
| Example 11 | 100 | 1*4 | 4*5 | 1*8 | — | — |
| Example 12 | 100 | 1*1 | 4*6 | 1*8 | — | — |
| Example 13 | 100 | 1*1 | 4*7 | 1*8 | — | — |
| Example 14 | 100 | 1*1 | — | 4*9 | — | — |
| Example 15 | 100 | 1*1 | 4*5 | 1*10 | — | — |
| Example 16 | 100 | 1*2 | 4*5 | 1*9 | 20*11 | — |
| Example 17 | 100 | 1*3 | 4*5 | 1*10 | — | 43*12 |
| Example 18 | 100 | 1*3 | 4*5 | 1*10 | 20*11 | 10*13 |
| Example 19 | 100 | 1*1 | 4*5 | 1*8 | — | 160*12 / 140*13 |
| Comparative Example 1 | 100 | — | — | — | — | — |
| Comparative Example 2 | 100 | 10*1 | — | — | — | — |
| Comparative Example 3 | 100 | 1*1 | 20*5 | 20*8 | — | — |
| Comparative Example 4 | 100 | — | — | — | 20*11 | — |
| Comparative Example 5 | 100 | — | — | — | — | 43*12 |
| Comparative Example 6 | 100 | — | — | — | 20*11 | 10*13 |

TABLE 2

| No. | Recrystallization peak (°C.) | Recrystallization peak (cal/g) | Glass of surface | Mold-releasing property | Crystallinity (%) | Bending strength (kg/cm²) | Bending modulus (kg/cm²) | Vicat softening point (C.°) |
|---|---|---|---|---|---|---|---|---|
| Example 1 | 100 | 1.7 | 48 | ○ | 48 | 1,010 | 41,000 | 245 |
| Example 2 | 124 | 1.4 | 100 | ○ | 49 | 1,020 | 41,300 | 246 |
| Example 3 | Disappeared | 0 | 100 | ○ | 53 | 1,050 | 42,000 | 256 |
| Example 4 | 128 | 1.9 | 100 | ○ | 48 | 1,010 | 40,900 | 246 |
| Example 5 | 112 | 0.7 | 100 | ○ | 51 | 1,040 | 41,800 | 254 |
| Example 6 | 120 | 1.2 | 100 | ○ | 50 | 1,030 | 40,000 | 252 |
| Example 7 | 121 | 1.3 | 100 | ○ | 50 | 1,030 | 40,100 | 251 |
| Example 8 | Disappeared | 0 | 100 | ○ | 55 | 1,050 | 42,200 | 257 |
| Example 9 | Disappeared | 0 | 100 | ○ | 52 | 1,030 | 41,700 | 251 |
| Example 10 | Disappeared | 0 | 100 | ○ | 53 | 1,020 | 41,600 | 254 |
| Example 11 | Disappeared | 0 | 100 | ○ | 53 | 1,030 | 41,700 | 253 |
| Example 12 | 109 | 0.5 | 100 | ○ | 51 | 1,010 | 40,900 | 250 |
| Example 13 | 106 | 0.4 | 100 | ○ | 51 | 1,000 | 40,800 | 250 |
| Example 14 | 121 | 1.2 | 100 | ○ | 48 | 1,010 | 40,600 | 249 |
| Example 15 | Disappeared | 0 | 100 | ○ | 52 | 1,040 | 42,100 | 253 |
| Example 16 | — | 0 | 100 | ○ | 52 | 970 | 38,000 | 246 |
| Example 17 | — | 0 | 87 | ○ | 53 | 1,570 | 104,000 | 260 |
| Example 18 | — | 0 | 93 | ○ | 52 | 1,240 | 56,000 | 246 |
| Example 19 | — | 0 | 81 | ○ | 53 | 1,650 | 157,000 | 266 |
| Comparative Example 1 | 159 | 5.0 | 60 | X | 12 | 890 | 37,400 | 224 |
| Comparative Example 2 | 145 | 2.5 | 75 | △ | 28 | 950 | 40,500 | 234 |
| Comparative Example 3 | — | 0 | 100 | ○ | 55 | 870 | 36,000 | 238 |
| Comparative Example 4 | 158 | 4.9 | 62 | X | 13 | 860 | 35,800 | 218 |
| Comparative Example 5 | 158 | 5.0 | 60 | X | 15 | 1,480 | 95,800 | 256 |
| Comparative Example 6 | 157 | 4.9 | 62 | △ | 14 | 530 | 45,000 | 211 |

What is claimed is:

1. A styrene-resin composition which comprises (a) 100 parts by weight of styrene-polymer having a high degree of syndiotactic configuration, (b) 0.01 to 15 parts by weight of at least one nucleating agent selected from an organophosphorus compound and a metal salt of an organic acid, and (c) 0.01 to 15 parts by weight of at least one component selected from a polyoxyalkylene compound, a fatty acid and a derivative thereof, and wherein a recrystallization peak of said composition measured by a differential scanning calorimeter (DSC) disappears, or the temperature of the recrystallization peak (Tcc) is 170° C. or lower, and peak area ($\Delta H$tcc) is 2 cal/g or less.

2. A styrene resin composition according to claim 1, wherein the organophosphorus compound is a compound represented by the general formula (B-I):

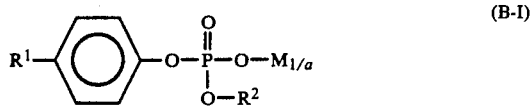

(wherein $R^1$ represents a hydrogen or an alkyl group having 1 to 18 carbon atoms, $R^2$ represents an alkyl group having 1 to 18 carbon atoms,

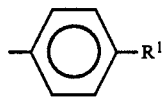

or $M_{1/a}$, M represents Na, K, Mg, Ca or Al, and a represents an atomic valence of M) or represented by the general formula (B-II):

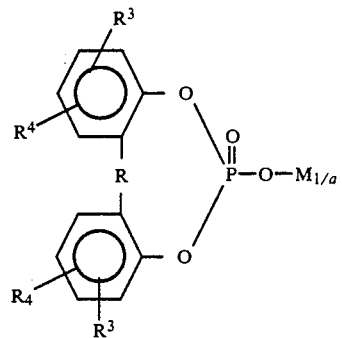

wherein R represents a methylene group, an ethylidene group, a propylidene group or an isopropylidene group, $R^3$ and $R^4$ independently represent a hydrogen atom or an alkyl group having 1 to 6 carbon atoms, and M and a are the same as defined above.

3. A styrene resin composition according to claim 1, wherein the metal salt of the organic acid is sodium, calcium, aluminium or magnesium salt of benzoic acid, p-(tert-butyl) benzoic acid, cyclohexane carboxylic acid (hexahydro benzoic acid), amino benzoic acid, $\beta$-naphthoic acid, cyclopentane carboxylic acid, succinic acid, diphenyl acetic acid, glutaric acid, isonicotinic acid, adipic acid, sebacic acid, phthalic acid, isophthalic acid, benzene sulfonic acid, glycolic acid, caproic acid, isocaproic acid, phenyl acetic acid, cinnamic acid, lauric acid, myristic acid, palmitic acid, stearic acid, or oleic acid.

4. A styrene resin composition according to claim 1, wherein the fatty acid derivative of the component (C) is an oxy fatty acid, a fatty acid amide, an alkylene-bis-fatty acid amide or a fatty acid ester.

5. A styrene-based resin composition according to claim 1, wherein the polyoxyalkylene compound is a polyoxyethylene compound represented the general formula:

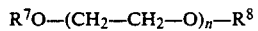

wherein $R^7$ and $R^8$ are each a hydrogen or an alkyl group having 1 to 4 carbon atoms, n is an integer of 4 to 450.

6. A styrene-based resin composition according to claim 1, wherein the fatty acid derivative is an alkylene-bis-fatty acid amide represented by the general formula:

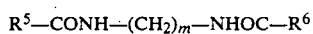

wherein $R^5$ and $R^6$ are each hydrocarbon portion of the fatty acid, and m is an integer of 1 to 10.

* * * * *